United States Patent
Keeley et al.

[11] 3,811,402
[45] May 21, 1974

[54] TEMPERATURE RESPONSIVE GAUGE

[76] Inventors: Robert A. Keeley, P.O. Box 1529, Salt Lake City, Utah 84110; A. Rae McFarland, 3485 Kingshill Dr., Salt Lake City, Utah 84121

[22] Filed: Dec. 26, 1972

[21] Appl. No.: 318,117

[52] U.S. Cl. ............................... 116/114.5, 73/358
[51] Int. Cl. ............................................. G01k 11/06
[58] Field of Search.. 116/114.5, 101, 103, 114 AH; 73/358, 419; 99/419, DIG. 10

[56] References Cited
UNITED STATES PATENTS

| | | | |
|---|---|---|---|
| 1,441,307 | 1/1923 | Swanberg | 116/114.5 |
| 3,020,874 | 2/1962 | Bruce et al. | 116/114 AH |
| 3,479,876 | 11/1969 | Kliewer | 73/358 |
| 3,548,780 | 12/1970 | Kliewer | 116/114.5 |
| 3,656,452 | 4/1972 | Kliewer | 116/114.5 |
| 3,693,579 | 9/1972 | Kliewer | 116/114.5 |
| 3,626,897 | 12/1971 | Kliewer | 116/114.5 |

FOREIGN PATENTS OR APPLICATIONS
1,258,947  3/1961  France ........................ 116/114 AH Primary Examiner—Louis J. Capozi

[57] ABSTRACT

An improved, easily produced, low-cost but reliable pop-out-type gauge adapted to be inserted in poultry, meats, etc., and to indicate when a predetermined temperature has been reached within the object in which the gauge is inserted. The gauge has a pointed housing, a membrane forming flotation cap and a thermally responsive unit held in the housing by the cap. The thermally responsive unit is pre-assembled before being placed in the housing and includes a shaft with an end pointed to rupture the membrane, and a spring held in a compressed condition around the shaft by a fusible member, such that release of the spring by the fusible member will force the shaft through the membrane.

6 Claims, 5 Drawing Figures

PATENTED MAY 21 1974　　3,811,402

TEMPERATURE RESPONSIVE GAUGE

BRIEF DESCRIPTION OF THE INVENTION

1. Field of the Invention

This invention relates to temperature indicators and particularly to such indicators as are commonly inserted in poultry, meat, etc., and that provide signal means to indicate when a predetermined temperature has been reached at an inserted tip of the indicator.

2. Prior Art

There have been many thermally responsive signalling devices proposed in the past to be inserted into poultry, meat and other foods so that the user will be alerted when the food surrounding the inserted device reaches a predetermined temperature. Devices of this type include those shown, for example, in U.S. Pat. Nos. 2,677,298, 3,140,611, 3,090,235, 3,280,629, 3,548,780, 3,559,615, 3,626,897, 3,682,130 and 3,693,579.

However, there still exists a need for a temperature responsive gauge that can be readily adapted for use with poultry and meats and also with other diverse fresh and frozen food items. It is necessary that a suitable, acceptable gauge of this type be reliable and economically mass produced so that use of the gauges, in connection with food items, does not significantly raise the sales price of the items to the consumer.

SUMMARY OF THE INVENTION

Principal objects of the present invention are to provide a temperature responsive gauge that is reliable, durable and inexpensive.

Other objects are to provide such a gauge that is easy to read and that is usable in any desired position.

Still other objects are to provide a gauge that is easily machine manufactured and assembled and that uses a minimum amount of fusible material.

Principal features of the invention include a housing with a freely inserted thermal responsive unit placed therein and a membrane containing sealing cap that holds the thermal responsive unit within the housing and aligned to perforate a membrane of the cap. A spring stop on the thermal responsive unit element is conically shaped to seal a guide sleeve on the cap after perforation so that fusible material does not escape from the housing.

A spring on the thermal responsive unit is held in compressed condition by the fusible material while the fusible material is in a solid state and expands against the housing when the fusible material melts, to propel a sharpened end of a shaft of the thermal responsive unti through the perforable membrane.

Additional objects and features of the invention will become apparent from the following detailed description and drawings, disclosing what is presently contemplated as being the best modes of the invention.

THE DRAWINGS

In the drawings:

FIG. 1 is a top plan view of a gauge of the invention;

FIG. 2, a side elevation view;

FIG. 3, a vertical section, taken on the line 3—3 of FIG. 2, and showing one preferred embodiment of the invention;

FIG. 4, a view like that of FIG. 3, showing another embodiment of the invention; and FIG. 5, a schematic view showing how the fusible material is punched and applied to a shaft of a thermal responsive unit of the embodiment of FIG. 4, in a single one-step operation.

DETAILED DESCRIPTION

Figure 1:
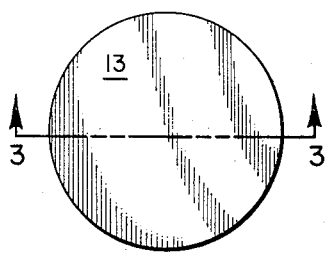
Figure 2:
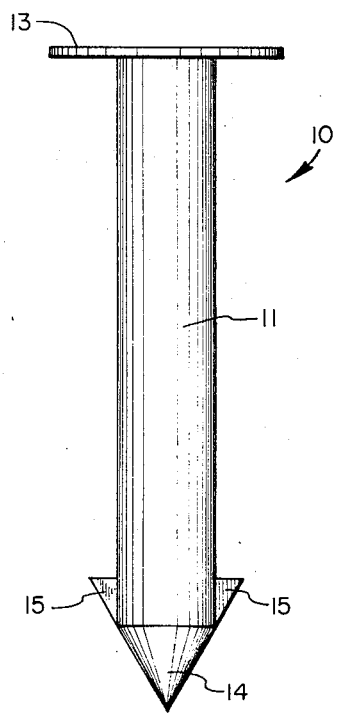

Referring now to the drawings:

In the illustrated preferred embodiments, the gauge of the invention, shown generally at 10, includes an outer housing 11, a thermal expansible responsive unit (shown at 12 in FIG. 3 and at 12' in FIGS. 4 and 5) and a sealing cap 13.

The housing 11 is of generally tubular configuration and is preferably made of a heat conductive plastic capable of being subjected to baking and roasting temperatures without deformation. One end 14 of the housing is closed and is exteriorly pointed to allow the housing to be readily inserted into a food product, or the like, to be heated. Barbs 15 on the housing, near the pointed end allow ready insertion of the pointed end into an object and keep it from being forced back out during cooking operation.

The other end of housing 11 is open, but is adapted to be sealed by the cap 13 after the expansible member 16 has been placed in the housing. Cap 13 includes a flared head portion 13a, with a thin membrane 13b formed by the central area of the head portion. The enlarged or flared portion of the cap provides flotation to the gauge. The top distributes the weight of the gauge over a large area and keeps the gauge from sinking completely into the food product in which the gauge is inserted. This is particularly important when the food product is frozen meat patties or steaks in gravy, or other such product.

A sleeve 17 surrounds the membrane 13b and projects from one face of the cap 13 to be inserted into the open end of the housing 11. A pair of parallel rings 18, formed on the outside of sleeve 17, project therefrom to snap into corresponding parallel grooves provided in the interior of the housing when the sleeve 17 is fully inserted therein and the head portion extends across the end thereof.

Figure 3:
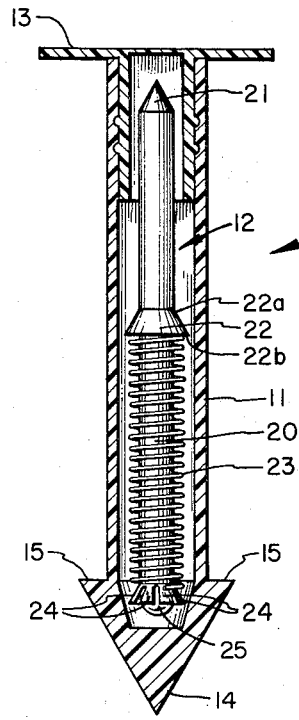

The thermal responsive unit 12, FIG. 3, includes a tubular shaft 20 with one end 21 closed and pointed, and with a collar 22 formed intermediate the length of the shaft. The collar presents a tapered, conical configuration 22a on the side nearest end 21 and has an abrupt surface 22b on the other side to serve as a spring stop.

A coil spring 23 surrounds the shaft 20 on the side of collar 22 opposite end 21 and the spring is held compressed between the collar 22 and fingers 24 at the other end of the shaft 20. The fingers 24 are formed between slots in the wall of the tubular shaft 20 and a pellet 25 of fusible material holds the fingers flared such that the spring held between the collar 22 and the fingers cannot expand beyond them. When the melting temperature of the pellet 25 is reached, however, the pressure of the spring on the fingers will squeeze the melted fusible material from between the fingers and as the fingers compress the spring can expand. The pellet 25 in its solid state is slightly larger than the inner diameter of the tubular shaft 20 so that the fingers will be flared and the pressure of the compressed spring, acting on the fingers holds the pellet in place between the fingers.

The length of the shaft 20 is such that when the unit is fully assembled and the end of the shaft containing pellet 25 is against the inner closed end of housing 11, the pointed end 21 extends slightly into the sleeve 17, and is slightly spaced from the membrane 13b. The fusible materials used with the present invention are well known and can be, for example, of the types disclosed in the aforementioned prior art patents.

In assembly of the gauge, the thermal responsive unit is constructed by placing the pellet 25 between the fingers to flare them outwardly. The spring 23 is then wound around shaft 20, in compressed condition, between the collar and the flared fingers. The thermal responsive unit 12 is placed in housing 11 with the pallet containing end being inserted first and the cap 13 is locked to the housing, thereby sealing the opening to the housing.

In use, the pointed, barbed end of housing 11 is inserted into a turkey, pork or beef roast, frozen swiss steaks, or other food item to be cooked. When the item is cooked and the interior of the housing 11 at the pointed end reaches the temperature at which the pellet 25 melts (the pellet being constructed of materials that will insure melting at a temperature at which the food item is fully cooked) the spring 23 expands, as previously described. When the expanding spring acts against housing 11, the reactionary force propels the pointed end 21 of shaft 20 through the membrane 13b until the tapered surface 22a of collar 22 seats against sleeve 17 to seal off passage through the sleeve. The portion of the shaft 20 extending through the membrane then serves as an indicator that the temperature for which the gauge has been designed (as determined by the constituency of the pellet 25) has been reached at the pointed and barbed end of housing 11.

With the construction described, the housing 11 is fully sealed against the entrance of blood, juices, gravies, etc. that could prevent proper functioning of the thermal responsive unit before the spring is expanded. When the spring 23 expands and the membrane 13b is ruptured, the seating of collar 22 against sleeve 17 prevents escape of any of the fusible material from which pellet 25 is formed, thereby preventing contamination of the product in which the gauge is inserted.

Figure 4:
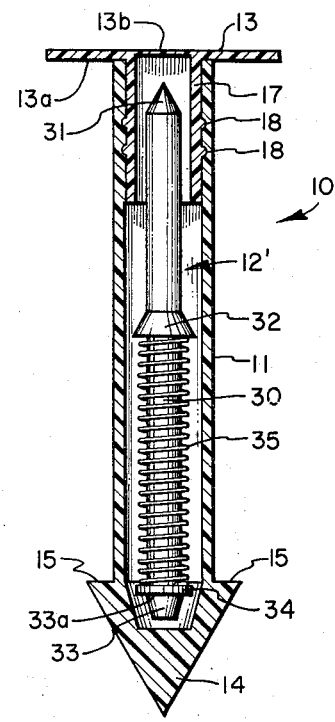
Figure 5:
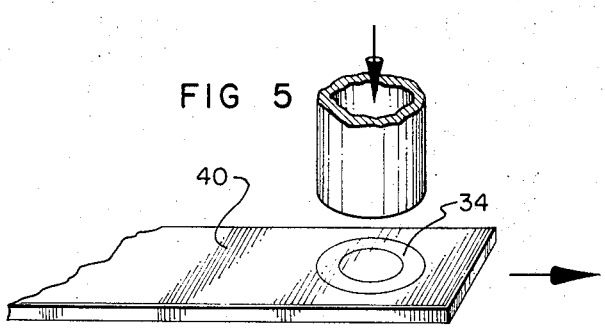
Figure 5:
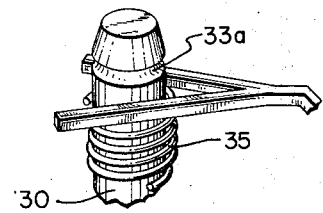

In FIGS. 4 and 5, there is shown another embodiment of the invention. In this embodiment, the housing 11 and cap 13 are the same as previously described and the identifying numbers used are therefor the same. The construction of the thermal responsive unit 12' differs from the construction of the thermal responsive unit previously described.

As shown, thermal responsive unit 12' includes a shaft 30 having a pointed end 31 that is adapted to fit into and to be guided by sleeve 17 of cap 13. A collar 32, shaped like and corresponding to the collar 22 previously described, is provided intermediate the length of shaft 20.

The end of shaft 30 opposite the pointed end 31 is tapered slightly at 33 and a groove 33a encircles the shaft near the end 33. A ring 34 of fusible material fits in groove 33a and a coiled spring 35, corresponding to the spring 23 previously described, is held compressed between the collar 32 and the ring 34.

As with the gauge previously described, when the temperature adjacent the tip end of housing 11 reaches the point at which the fusible material making up ring 34 melts and the spring 35 expands into engagement with housing 11, the reactionary force acting through collar 22 moves the pointed end 31 through the membrane 13b and the collar 22 into sealing engagement with sleeve 17.

It has been found that the embodiment of FIGS. 4 and 5 is particularly adaptable to machine production and that savings can be realized in the fusible material used. With the use of small fusible pellets, it is often difficult to dispense them singly and many are lost. With the use of rings, such as that shown at 34, however, the fusible material can be formed into continuous ribbons 40 from which the rings are punched by a punch 41 and simultaneously positioned in groove 33a. The rings are positioned after the spring 35 has been coiled around the shaft 30 and while the spring is held in a compressed condition. The ribbon from which the rings is punched is re-formed and is again punched so that little, if any, waste of the fusible material occurs.

Although a preferred form of our invention has been herein described, it is to be understood that the present disclosure is made by way of example and that variations are possible without departing from the scope of the hereinafter claimed subject matter, which subject matter we regard as our invention.

We claim:

1. A temperature responsive gauge comprising
   a generally tubular housing having one end closed and pointed;
   a thermal responsive unit in said housing, said thermal responsive unit including a shaft having one pointed end, a collar fixed to and surrounding said shaft intermediate its length, said collar being freely movable with respect to the inner wall of said housing, a spring coiled around said shaft at the side of the collar opposite the pointed end, the length of the expanded spring and the shaft from the collar to the tip of the pointed end being greater than the inside length of the tubular housing and means, including a fusible element carried by the other end of the shaft and at all times freely movable with respect to said housing for holding said spring in a compressed condition against the collar; and
   a cap sealingly closing the end of the housing opposite the pointed end thereof and including a membrane in alignment with the pointed end of the shaft, whereby when the fusible element melts, the spring expands to propel the pointed end of the shaft through the membrane.

2. A temperature responsive gauge as in claim 1, wherein
   the cap includes a sleeve extending into the housing such that when the other end of the shaft engages the housing the pointed end extends into the sleeve to a spaced distance away from the membrane.

3. A temperature responsive gauge as in claim 2, wherein
   the collar has a tapered side arranged to seat against the sleeve when the spring is expanded, whereby material in the housing cannot thereafter escape from the housing.

4. A temperature responsive gauge as in claim 3, wherein
  the means including a fusible element for holding the spring in a compressed condition against the collar comprises flexible fingers at the end of the shaft opposite the pointed end and a pellet of said fusible material positioned within the fingers, whereby said fingers are flared outwardly to be engaged by the spring.

5. A temperature responsive gauge as in claim 3, wherein
  the means including a fusible element for holding the spring in a compressed condition against the collar comprises
    a groove in the shaft adjacent the end opposite the pointed end and a ring of fusible material in the groove and projecting therefrom to be engaged by the spring.

6. A temperature responsive gauge comprising
  a generally tubular housing having one end closed and pointed and with barbs formed on the exterior of the housing at said one end, whereby said pointed end can be inserted into a food product and will be retained therein;
  means closing the end of the housing opposite the pointed end thereof; and
  a freely insertable thermal responsive unit loosely inserted into said housing, said unit including a shaft and a spring carried by the shaft, said spring being compressed on the shaft and held in compressed condition by a collar intermediate the length of the shaft and fusible means carried by one end of the shaft and freely movable with respect to the housing, whereby when a predetermined temperature is reached the spring is released by the fusible element and the shaft is projected from the end of the housing opposite to the pointed end.

* * * * *